(12) United States Patent
Acharya et al.

(10) Patent No.: US 6,917,381 B2
(45) Date of Patent: Jul. 12, 2005

(54) COLOR FILTER ARRAY AND COLOR INTERPOLATION ALGORITHM

(75) Inventors: Tinku Acharya, Chandler, AZ (US); Swagato Chakraborty, Kharagpur (IN); Ajoy Kumar Ray, Kharagpur (IN)

(73) Assignee: Intel Corporation, Santa Clara, CA (US)

(*) Notice: Subject to any disclaimer, the term of this patent is extended or adjusted under 35 U.S.C. 154(b) by 824 days.

(21) Appl. No.: 09/727,038

(22) Filed: Nov. 30, 2000

(65) Prior Publication Data

US 2002/0063789 A1 May 30, 2002

(51) Int. Cl.$^7$ .................. H04N 5/208; H04N 5/335
(52) U.S. Cl. .................. 348/252; 348/279; 348/281
(58) Field of Search .................. 348/252, 222.1, 348/266, 630, 272, 273, 279, 281; 358/525, 3.27; 382/165, 167, 199, 266

(56) References Cited

U.S. PATENT DOCUMENTS

| | | | | |
|---|---|---|---|---|
| 4,630,307 A | * | 12/1986 | Cok | 382/165 |
| 4,642,678 A | * | 2/1987 | Cok | 348/242 |
| 5,008,739 A | * | 4/1991 | D'Luna et al. | 348/246 |
| 5,054,100 A | * | 10/1991 | Tai | 382/300 |
| 5,382,976 A | * | 1/1995 | Hibbard | 348/273 |
| 6,404,918 B1 | * | 6/2002 | Hel-or et al. | 382/167 |
| 6,507,364 B1 | * | 1/2003 | Bishay et al. | 348/242 |
| 6,535,651 B1 | * | 3/2003 | Aoyama et al. | 382/300 |
| 6,563,537 B1 | * | 5/2003 | Kawamura et al. | 348/252 |
| 6,570,616 B1 | * | 5/2003 | Chen | 348/272 |
| 6,642,960 B1 | * | 11/2003 | Kohashi et al. | 348/246 |

OTHER PUBLICATIONS

C.R. Dyer, "Computing the Euler Number of an image from its Quadtree", Computer Graphics Image Processing, vol. 13, No. 3, pp. 270–276, Jul. 1980.
R.E. Gonzalez et al., "Digital Image Processing", Addison–Wesley, Reading, Massachusetts, pp. 504–506, 1993.
S.B. Gray, "Local Properties of Binary Images in Two Dimensions", IEEE Trans. Computers, No. 5, pp. 551–561, May 1971.
W.K. Pratt, "Digital Image Processing", John Wiley & Sons, 1978.
H. Samet et al., "Computing Geometric Properties of Images Represented by Linear Quadtrees", IEEE Trans. PAMI, vol. PAMI–7, No. 2, Mar. 1985.
C.M. Thomson et al., "Image Processing Toolbox", The Math Works Inc., USA.

* cited by examiner

Primary Examiner—Wendy R. Garber
Assistant Examiner—Timothy J. Henn
(74) Attorney, Agent, or Firm—Trop, Pruner & Hu, P.C.

(57) ABSTRACT

A color filter array includes arrangements of green-filtered pixels to optimize performance and accuracy of color interpolation operations. Where red or blue pixels are found, green values are estimated with a high degree of accuracy. Unknown red and blue intensity values are interpolated by converting known red and blue values to hue. The interpolated hue values are then converted to intensity data.

18 Claims, 12 Drawing Sheets

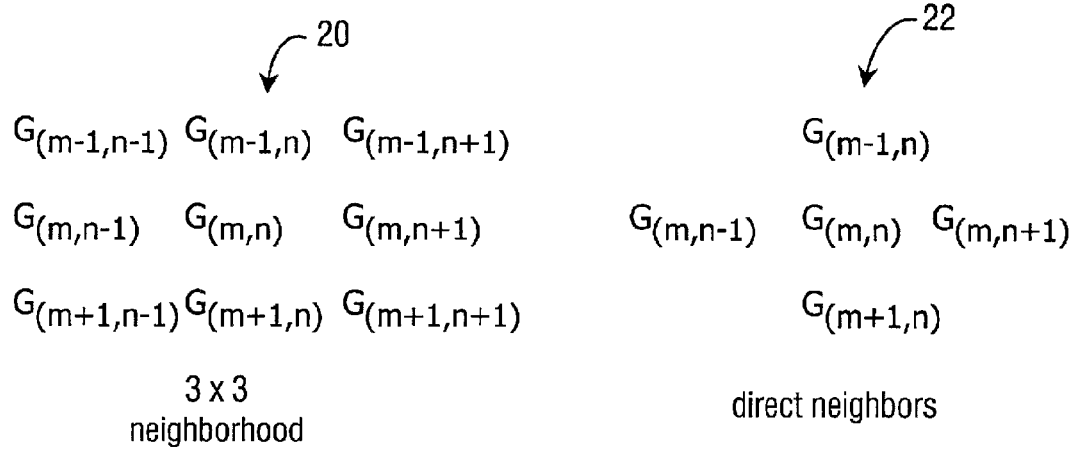
Figure 3A
Figure 3B
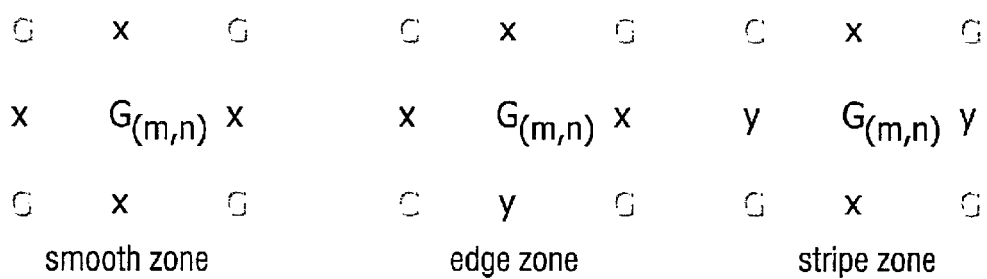
Figure 3C
Figure 3D
Figure 3E

* smooth zone

Figure 5B

$$\begin{array}{c} x \\ x \ H_{R(m,n)} \ * \quad * \quad y \\ * \\ * \\ \text{corner zone} \end{array}$$

Figure 5C

$$\begin{array}{c} y \\ x \ H_{R(m,n)} \ * \quad * \quad x \\ * \\ * \\ \text{stripe zone} \end{array}$$

$$H_{R(m,n-1)} \ast H_{R(m,n)} \ast \quad H_{R(m,n+2)}$$

26 ⟶ *

*

$$H_{R(m+3,n)}$$

smooth zone          stripe zone

\* \* $H_{R(m+3,n)}$ \* \* smooth zone

\* \* x \* \* vertical stripe

\* \* $H_{R(m+3,n)}$ \* \* diagonal zone

\* \* X \* \* smooth zone

* * y * * vertical zone

Figure 8C

COLOR FILTER ARRAY AND COLOR INTERPOLATION ALGORITHM

BACKGROUND

This invention relates to image processing and, more particularly, to a color filter array and method for performing color interpolation.

A digital camera captures an image using a sensor including a large number of pixels, or picture elements. Each pixel may include a light-sensitive photocell or other circuitry that produces a voltage upon receiving incident light. The voltage is converted to digital form in the camera. The digitized image data may be stored, manipulated, or transmitted to another location within or outside the camera.

Rather than recording color, the circuitry of the pixel records intensity information of the image. Accordingly, the color information may be extracted from the intensity data using color filters. Although other color combinations are sometimes used, some arrangements of color filters extract the three primary colors: red, green, and blue. From combinations of the three colors, the entire color spectrum, from black to white, may be derived.

Cameras employ different mechanisms for obtaining the three primary colors from the incoming photons of light. Very high quality cameras, for example, may employ three separate sensors, a first with a red filter, a second with a blue filter, and a third with a green filter. Such cameras typically have one or more beam splitters that send the light to the different color sensors. All sensor photocells receive intensity information simultaneously. Because each photocell is receiving light filtered through a distinct color, each pixel value is dedicated to a single color. The additional hardware, however, makes these cameras relatively expensive.

A second method for recording the color information is to rotate a three-color filter across the sensor. Each pixel may store all three colors, in sequence. However, each color is stored at a different point in time. Thus, this method works well with still, but not candid or handheld photography, because the three colors are not obtained at precisely the same moment.

A third method for recording the three primary colors from a single image is to dedicate each pixel to a different color value. Different photocells of the sensor are filtered with one of the red, green, and blue filters. The arrangement of differently colored filters upon a sensor is known as a color filter array (CFA). CFA sensors allow each of the red, green, and blue pixels to receive image information simultaneously. Once the image is recorded, the true color, or three-color representation, for each pixel may subsequently be derived using color interpolation.

Color interpolation depends on the pattern, or "mosaic," that describes the layout of the filters on the pixels of the sensor. One common mosaic is known as a Bayer pattern. The Bayer pattern alternates red and green pixels in a first row of the sensor with green and blue pixels in a second row of the sensor. Thus, there are twice as many green pixels (50%) as either red pixels (25%) or blue pixels (25%). The green pixels are preferred because the human eye is more sensitive to luminance in the green color region.

CFA sensors, including the Bayer-patterned sensor, are useful for some color imaging because a single sensor is used, yet all the color information is recorded at the same moment. This allows for smaller, cheaper, and more versatile cameras. Since each pixel records information from one color, information for the remaining colors is missing from that pixel. Accordingly, color interpolation is typically performed on image data produced by a CFA sensor.

A variety of color interpolation algorithms, both adaptive and non-adaptive, may be performed to synthesize the color pixels. Non-adaptive algorithms are performed in a fixed pattern for every pixel in a group. Such algorithms include nearest neighbor replication, bilinear interpolation, cubic convolution, and smooth hue transition.

Adaptive algorithms detect local spatial features in a group of pixels, then apply some function, or predictor, based on the features. Examples of adaptive algorithms include edge sensing interpolation, pattern recognition, and pattern matching interpolation, to name a few.

While CFA patterns are popular in digital camera sensors, performing color interpolation on CFA image data produces mixed results. Since color interpolation provides a more complete representation of the image than the image data recorded by the CFA, a CFA pattern that simplifies the color interpolation algorithm may increase the usefulness of some digital cameras.

Thus, there is a continuing need to provide a color filter array pattern that facilitates efficient color interpolation.

BRIEF DESCRIPTION OF THE DRAWINGS

FIGS. 3A–3E are diagrams illustrating the color interpolation of green values using the CFA of FIG. 1 according to one embodiment of the invention;

FIGS. 5A–5D are diagrams illustrating the color interpolation of red (or blue) hues for one sub-block of image data according to one embodiment of the invention;

FIGS. 6A–6C are diagrams illustrating the color interpolation of red (or blue) hues for a second sub-block of image data according to one embodiment of the invention;

FIGS. 7A–7D are diagrams illustrating the color interpolation of red (or blue) hues for a third sub-block of image data according to one embodiment of the invention;

FIGS. 8A–8C are diagrams illustrating the color interpolation of red (or blue) hues for a fourth sub-block of image data according to one embodiment of the invention.

DETAILED DESCRIPTION

When an image is captured, the image includes a number of elements, known as pixels, each of which describes the intensity of the image for a particular location. The color of a particular pixel in a color image is typically specified by red, green, and blue color components. Where each color is described by an 8-bit value, the pixel is represented by a 24-bit value, eight bits for each of the red, green, and blue components.

However, capturing a 24-bit representation of each pixel of an image is costly. Instead, a sensor, the part of a digital camera that receives the image information, typically includes a filter mosaic called a color filter array (CFA). Each filter in the CFA covers a single pixel and permits only a specific color of a particular spectral band to pass through the filter. Under such an arrangement, at each pixel location, a single color intensity is captured while the other two color intensities are missing.

Color interpolation allows the missing color information to be "recovered." At each pixel location, the two missing colors may be interpolated, based upon available information about neighboring pixel locations. Both adaptive and non-adaptive color interpolation algorithms have been implemented on CFAs. The results for the various algorithms are mixed. Some algorithms are favored for still images while others are preferred because of their speed, complexity, or other factors.

When observing a color image, the human eye is better able to discern luminescence in green colors, whereas red and blue colors contribute to the intensity of the image. This is because human eye receptors are more sensitive to the green color than to either red or blue colors. The estimation of the green color in an image, therefore, is arguably more important for ensuring the visual quality of an interpolated image.

With this in mind, many CFAs favor green filters over red and blue filters. For example, the commonly used Bayer pattern employs 50% green filters, 25% red filters, and 25% blue filters, arranged in a particular mosaic. Because CFA-based image data is color interpolated, a CFA which enhances the color interpolation operation, whether by reducing its complexity or by increasing the quality of the interpolated image, may be desirable.

Figure 1:
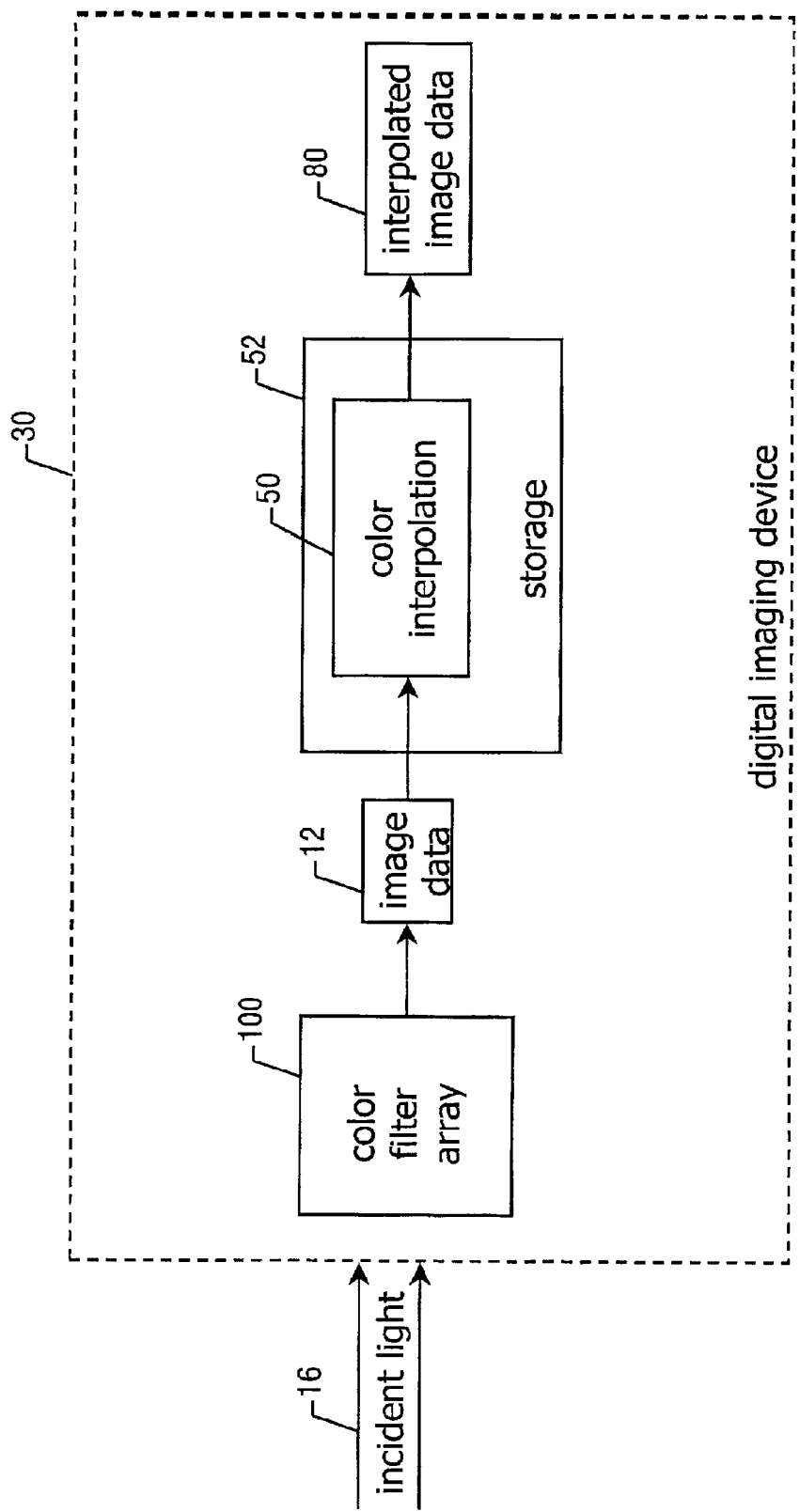
FIG. 1 is a block diagram of a digital imaging device employing the color filter array and color interpolation algorithm according to one embodiment of the invention.

In FIG. 1, a digital imaging device 30 receives incident light 16 into a novel color filter array (CFA) 100 to produce image data 12, in one embodiment. The digital imaging device 30 may be a camera, a scanner, or a printer, to name a few examples. The CFA 100 is positioned over a sensor (not shown) that converts the incident light to a measurable voltage. The particular arrangement of filters on the CFA 100 are described in FIG. 2, below.

In one embodiment, the digital imaging device 30 performs a color interpolation operation or algorithm 50 on the image data 12 to produce interpolated image data 80. The interpolated image data 80 may be compressed or otherwise processed in the digital imaging device 30, or may be transmitted from the imaging device 30 to another entity, such as a computer or other processor-based system. The color interpolation algorithm 50 is discussed in more detail, below.

Figure 2:
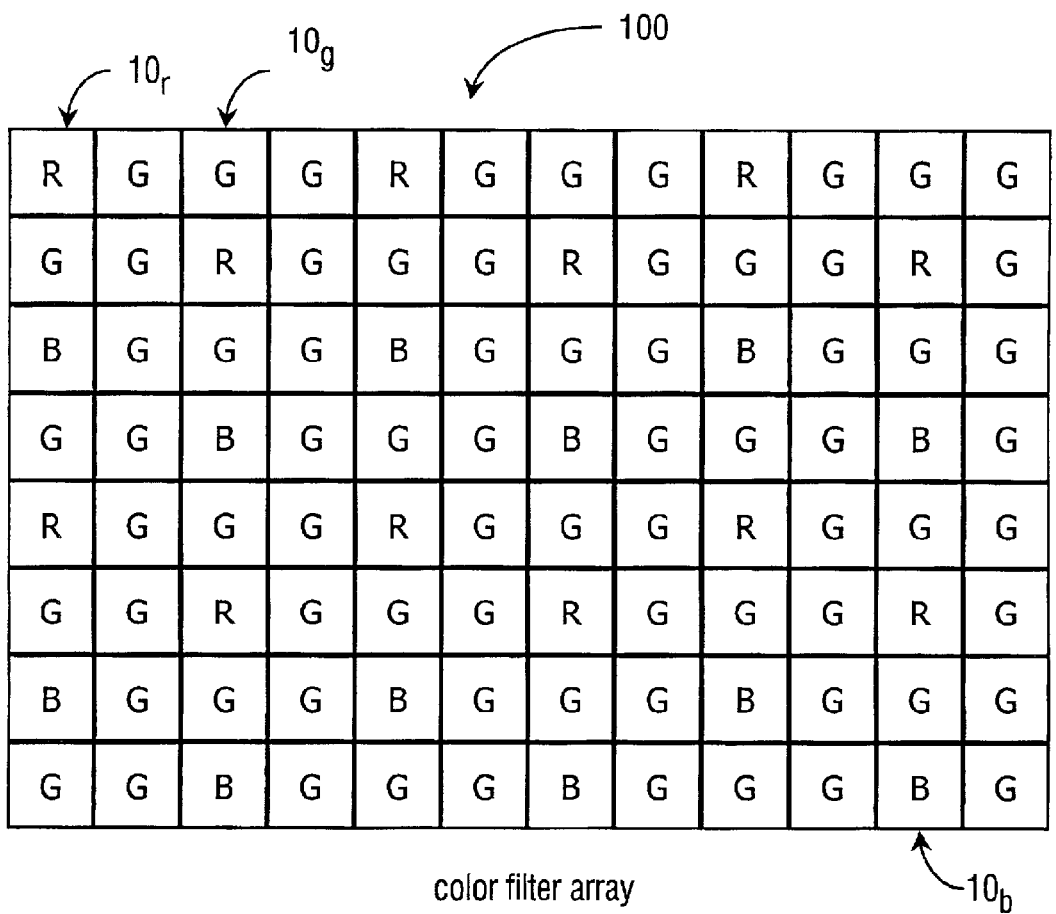
FIG. 2 is a diagram of a novel color filter array according to one embodiment of the invention.

In FIG. 2, according to one embodiment, the CFA 100 is arranged in a particular mosaic or pattern. The CFA 100 includes a plurality of pixels 10. Each pixel 10 has one of three color filters associated therewith. In one embodiment, the red-green-blue (RGB) color space is represented. Pixel $10_r$ is associated with a red filter, pixel $10_g$ is associated with a green filter, and pixel $10_b$ is associated with a blue filter. The filters of the CFA 100 may be arranged using other color spaces, such as cyan-magenta-yellow (CMY), in some embodiments.

Like Bayer-patterned filters, the CFA 100 includes more green pixels $10_g$ than blue pixels $10_b$ or red pixels $10_r$. In the CFA 100, green pixels $10_g$ comprise more than half the pixels 10. In one embodiment, a first row of the CFA 100 includes a red pixel $10_r$ followed by three green pixels $10_g$, then a red pixel $10_r$, then three green pixels $10_g$. A second row of the CFA 100 includes the same arrangement as the first row, except the row does not start with a red pixel $10_r$, but with two green pixels $10_g$.

A third row and fourth row are arranged just as the first two rows, only the red pixels $10_r$ are replaced with blue pixels $10_b$. Subsequent rows of the CFA 100 are simply replications of the first four rows. Ultimately, the CFA 100 includes 75% green pixels $10_g$, 12.5% blue pixels $10_b$, and 12.5% red pixels $10_r$.

The CFA 100 is arranged such that the estimation, or interpolation, of green color values may be more accurate. The pixels 10 for which green estimation is to be made include the red pixels $10_r$ and the blue pixels $10_b$. These pixels $10_r$ and $10_b$ are surrounded on all sides by green pixels $10_g$. In other words, any unknown green pixel $10_g$ in the CFA 100 is surrounded by a set of known green pixels $10_g$ in all eight directions, e.g., in its 3×3 neighborhood.

As shown in FIG. 1, the CFA 100 produces image data 12. The image data 12 includes intensity information associated with each of the pixels $10_r$, $10_g$, and $10_b$, of the CFA 100. The color interpolation algorithm 50 operates on the intensity information in the image data 12. In the following discussion, variables, R, G, and B are used to denote the intensity information for the red pixel $10_r$, green pixel $10_g$, and blue pixel $10_b$, respectively.

In FIG. 3A, a 3×3 neighborhood 20 of the CFA 100 includes eight green pixels $10_g$, corresponding to image data values, $G_{(m-1,n-1)}$, $G_{(m-1,n)}$, $G_{(m-1,n+1)}$, $G_{(m,n-1)}$, $G_{(m,n+1)}$, $G_{(m+1,n-1)}$, $G_{(m+1,n)}$, and $G_{(m+1,n+1)}$, surrounding an image data value, $G_{(m,n)}$, for which the green component is unknown. The unknown green value, $G_{(m,n)}$, may be associated with any location of the CFA 100 where a red pixel $10_r$ or a blue pixel $10_b$ is known. In one embodiment, the color interpolation algorithm 50 concentrates on the 3×3 neighborhood 20 surrounding each unknown pixel 10.

In estimating the unknown green value, $G_{(m,n)}$, the color interpolation algorithm 50 observes the intensity values of direct neighbors 22 of the green value, $G_{(m,n)}$. As shown in FIG. 3B, the direct neighbors of $G_{(m,n)}$ are $G_{(m-1,n)}$, $G_{(m,n-1)}$, $G_{(m,n+1)}$, and $G_{(m+1,n)}$. Where the intensity values of direct neighbors 22 are similar, certain patterns may be expected.

In FIG. 3C, for example, all the direct neighbors 22 of the unknown green value, $G_{(m,n)}$, have approximately the same intensity value, x. Thus, the unknown green value, $G_{(m,n)}$, is in a smooth zone or region. In one embodiment, where the unknown green value, $G_{(m,n)}$, occupies a smooth zone, the green value, $G_{(m,n)}$, is estimated by taking an average of the values of the four direct neighbors:

$$G_{(m,n)}=(G_{(m-1,n)}+G_{(m,n-1)}+G_{(m,n+1)}+G_{(m+1,n)})/4$$

where $G_{(m-1,n)} \approx G_{(m,n-1)} \approx G_{(m,n+1)} \approx G_{(m+1,n)} \approx x$, then $G_{(m,n)} \approx 4x/4 \approx x$.

In FIG. 3D, three of the direct neighbors 22 of the unknown green value, $G_{(m,n)}$, have approximately the same intensity value, x, while the fourth direct neighbor, $G_{(m+1,n)}$, has a distinct intensity value, y. The unknown green value, $G_{(m,n)}$, is thus in an edge zone. In one embodiment, the color interpolation algorithm 50 estimates the green value, $G_{(m,n)}$, by averaging the three values which are similar, then weighting the average by some constant, as shown:

$$G_{(m,n)}=[k^*(G_{(m-1,n)}+G_{(m,n-1)}+G_{(m,n+1)})/3+G_{(m+1,n)}]/(k+1)$$

The constant, k, may be determined based on how close x is to y or based upon other factors. In one embodiment, k is determined by assessing the intensity values, x and y, where $L=|x-y|$, as follows:

if $L \leq 20$, $K=L/5+1$ else K=5

In FIG. 3E, two of the direct neighbors, $G_{(m-1,n)}$ and $G_{(m+1,n)}$, of the unknown green value, $G_{(m,n)}$, have approximately one intensity value, x, while the other two direct neighbors, $G_{(m,n-1)}$ and $G_{(m,n+1)}$, have approximately a second intensity value, y. Accordingly, the unknown green value, $G_{(m,n)}$, is in a stripe zone, and is likely to have one of the intensity values, x or y. In one embodiment, the color interpolation algorithm 50 performs difference calculations as follows:

$$\Delta G_H = |G_{(m,n-1)} - G_{(m,n+1)}|$$

$$\Delta G_V = |G_{(m-1,n)} - G_{(m+1,n)}|$$

and, where ($\Delta G_H > \Delta G_V$), then $$G_{(m,n)} = [k^*(G_{(m-1,n)} + G_{(m+1,n)})/2 + (G_{(m,n-1)} - G_{(m,n+1)})/2]/4,$$

again, using a constant, k. In one embodiment, k is derived by taking the difference between $G_H$ and $G_V$ ($L = |G_H - G_V|$) and using the following formula:

if $L \leq 20$, $k = L/5 + 1$ else $k = 5$

In other words, where the difference between horizontal pixels, $G_{(m,n-1)}$ and $G_{(m,n+1)}$, is greater than the difference between vertical pixels, $G_{(m-1,n)}$ and $G_{(m+1,n)}$, a stronger inference of a "stripe" is present in the vertical pixels, and, thus, the vertical pixels are afforded more weight in interpolating to the unknown green value, $G_{(m,n)}$. The weight is determined by the relative strength of the stripe, as given above.

Thus, by analyzing its direct neighbors 22, the color interpolation algorithm 50 may derive the green value, $G_{(m,n)}$. A complete representation of the green color for the image data 12 is thus obtained. The particular arrangement of color filters in the CFA 100 facilitates the interpolation of the unknown green color values. Because each unknown green color value is surrounded by known color values, a more precise estimate of the unknown value may be made, in some embodiments.

In one embodiment, the color interpolation algorithm 50 next derives color hue information. Hue is the color component of a color signal. Recall, however, that a color signal is an amalgam of three colors, such as red, green and blue. Thus, hue may be measured as the relative intensity of red or blue color with respect to the green color.

In one embodiment, the image data 12 is captured as a logarithm of the intensity of the incident light 16. Since the intensity values for each color are captured in logarithmic form, the hue for each color may be obtained by subtracting the intensity information received.

In one embodiment, the color interpolation algorithm 50 derives the red hue and from image data 12 associated with red pixels $10_r$ of the CFA 100. Likewise, the blue hue is derived from color values associated with blue pixels $10_b$ of the CFA 100. Following green color interpolation, as described above, each red pixel $10_r$ has an associated red value, R, obtained when the image was captured, and an interpolated green value, G. In one embodiment, the color interpolation algorithm 50 derives the red hue, $H_R$, of the pixel $10_r$, as follows:

$$H_R = R - G$$

Likewise, each blue pixel $10_b$ has an associated blue value, B, obtained when the image was captured, and an interpolated green value, G. In one embodiment, the color interpolation algorithm 50 obtains the blue hue, $H_B$, of the pixel $10_b$, according to the following formula:

$$H_B = B - G$$

Thus, for each blue pixel $10_b$, the blue hue, $H_b$, can be obtained. For each red pixel $10_r$, the red hue, $H_r$, can be obtained. Likewise, color information, R and B, may be obtained from hue information, $H_R$ and $H_B$, as follows:

$$R = H_R + G, \text{ and}$$

$$B = H_B + G$$

The red and blue color values may be interpolated from the known red, R, and blue, B, color values, just as was done with the green color values, G, as described above. However, using the CFA 100, each of the red, R, and green, G, values may be obtained for only 12.5% of the image data 12. Thus, the likelihood of accurately estimating color information from known color values is diminished for the red and blue colors.

The human eye does not process image data in terms of absolute color values. Instead, the human eye discerns color in relative terms. Looking at the formulas for $H_B$ and $H_R$, hue is defined as a relative relationship between two color values. Thus, hue information is well-suited to being used for color interpolation, particularly where the number of data samples is small. In one embodiment, the estimation of red and blue hues from known hues provided more accurate color data than estimating red and blue colors from known colors.

Figure 4:
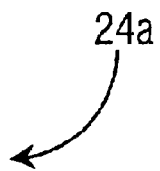
FIG. 4 is a diagram of a sub-block of image data in which red color values are translated into hue values according to one embodiment of the invention.
Figure 4:
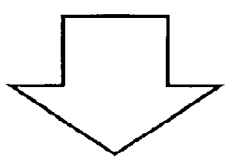
Figure 4:
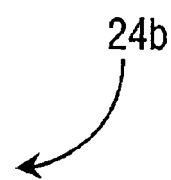

In FIG. 4, an arrangement of known red values, R, associated with the red pixels $10_r$, is shown in a sub-block 24a comprising red, R, blue, B, and green, G values of the image data 12. The known red values, R, are oriented in a symmetrical pattern. Although not illustrated, the known blue values, B, are oriented in the same symmetrical pattern as the known red values, R.

Using the formula above, the red hue, $H_R$, may be obtained for each of the red values, R, as shown in a sub-block 24b in FIG. 4. In one embodiment, the red hues, $H_R$, for other unknown locations of the sub-block 24 are obtained by the color interpolation algorithm 50.

In FIG. 5A, an unknown red hue, $H_{R(m,n)}$, is positioned in a neighborhood 26 comprising known red hues, $H_{R(m,n-1)}$, $H_{R(m-1,n+1)}$ and $H_{R(m,n+3)}$. The unknown red hue, $H_{R(m,n)}$, is positioned just to the right of known red hue, $H_{R(m,n-1)}$, and two positions to the left of known red hue, $H_{R(m,n+3)}$.

The unknown red hue, $H_{R(m,n)}$, may be part of a smooth zone, shown in FIG. 5B, in which the known red hues, $H_{R(m,n-1)}$, $H_{R(m-1,n+1)}$ and $H_{R(m,n+3)}$, all have approximately the same intensity, x. In one embodiment, the color interpolation algorithm 50 derives the unknown red hue, $H_{R(m,n)}$, in a smooth zone as follows:

$$H_{R(m,n)} = (k^* H_{R(m,n-1)} + j^* H_{R(m-1,n+1)} + p^* H_{R(m,n+3)})/(k+j+p)$$

where k, j, and p are variables that weight the known red hues according to the inverse of their relative radial distances from the pixel with unknown red hue, $H_{R(m,n)}$, in one embodiment. In this example, the weights are assigned as k=1, j=½, and p=⅓.

In FIG. 5C, the neighborhood 26 includes two known red hues, $H_{R(m,n-1)}$, $H_{R(m-1,n+1)}$, with a value approximating x and the third known red hue, $H_{R(m,n+3)}$, with a value approximating y. This arrangement appears to be a corner zone. In one embodiment, the color interpolation algorithm 50 derives the unknown red hue, $H_{R(m,n)}$, in a corner zone using the following formula:

$$H_{R(m,n)}=[2*[(H_{R(m,n-1)}+1/\sqrt{2}*H_{R(m-1,n+1)})/(1+1/\sqrt{2})]+H_{R(m,n+3)}]/3$$

Alternatively, the neighborhood 26 may be arranged as depicted in FIG. 5D, where known red hues, $H_{R(m,n-1)}$ and $H_{R(m,n+3)}$, approximate the same value, x. Known red hue, $H_{R(m-1,n+1)}$, however, approximates a different intensity value, y. Accordingly, the neighborhood 26 is in a stripe zone. In one embodiment, the color interpolation algorithm 50 derives the unknown red hue, $H_{R(m,n)}$, in a stripe zone by performing the following operation:

$$H_{R(m,n)}=[1.5*(3*H_{R(m,n-1)}+H_{R(m,n+3)})/4+H_{R(m-1,n+1)}]/2.5$$

where the known red hues, $H_{R(m,n-1)}$ and $H_{R(m,n+3)}$, are given more weight because of the possible continuity. In one embodiment, where a shorter radial distance between known hues is found, a higher weight value is assigned, and vice-versa.

Figure 6A:
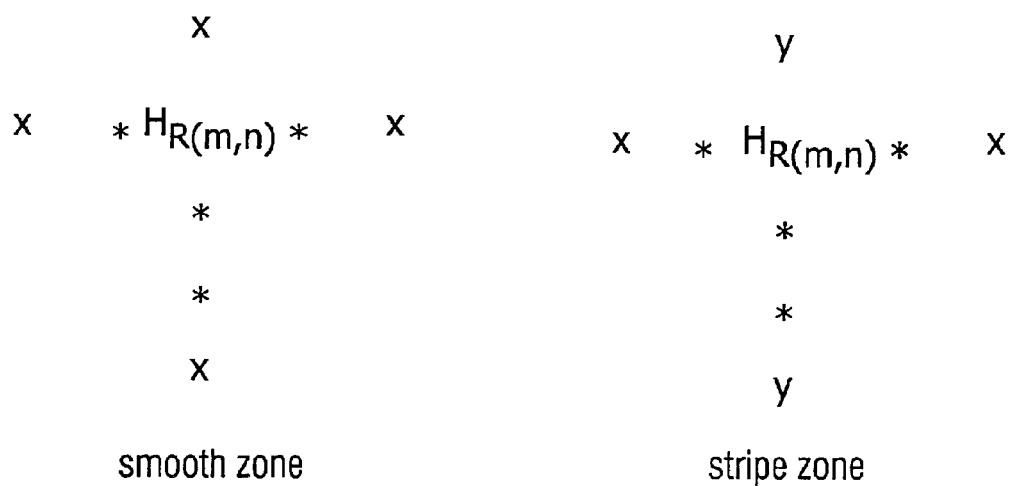

In FIG. 6A, the unknown red hue, $H_{R(m,n)}$, is positioned in the center of the neighborhood 26, equally positioned between known red hues, $H_{R(m,n-1)}$ and $H_{R(m,n+2)}$, directly below known red hue, $H_{R(m-1,n)}$, and two positions above known red hue, $H_{R(m+3,n)}$.

A smooth zone is depicted in FIG. 6B, in which each known red hue is approximately x. In one embodiment, the color interpolation algorithm 50 estimates the red hue, $H_{R(m,n)}$, as follows:

$$H_{R(m,n)}=(H_{R(m,n-1)}+H_{R(m,n+2)}+H_{R(m-1,n)}+H_{R(m+3,n)})/4$$

In FIG. 6C, a corner zone is suggested where known red hues, $H_{R(m,n-1)}$ and $H_{R(m-1,n+1)}$, have similar values, x, while $H_{R(m,n+3)}$ has a distinct value, y. Thus, the neighborhood 26 may include a horizontal or a vertical stripe. In one embodiment, the color interpolation algorithm 50 determines whether the unknown red hue, $H_{R(m,n)}$, is part of a horizontal stripe, $H_{RH}$, or of a vertical stripe, $H_{RV}$, then applies one of the following formulas to estimate the red value, $H_{R(m,n)}$:

$$H_{R(m,n)}=H_{RH}=(2*H_{R(m,n-1)}+H_{R(m,n+2)})/3$$

$$H_{R(m,n)}=H_{RV}=(3*H_{R(m-1,n)}+H_{R(m+3,n)})/4$$

In FIG. 7A, the unknown red hue, $H_{R(m,n)}$, is positioned in the center of a neighborhood 28, directly below known red hue, $H_{R(m-1,n)}$, and including known red hues, $H_{R(m-2,n-2)}$, $H_{R(m-2,n+2)}$, $H_{R(m+2,n-2)}$, $H_{R(m+3,n)}$, and $H_{R(m+2,n+2)}$.

A smooth zone is depicted in FIG. 7B, in which three of the known red hues, $H_{R(m-1,n)}$, $H_{R(m-2,n-2)}$, and $H_{R(m-2,n+2)}$, are approximately x. In one embodiment, the color interpolation algorithm 50 estimates the red hue, $H_{R(m,n)}$, for a smooth zone as follows:

$$H_{R(m,n)}=(H_{R(m,n-1)}+H_{R(m-2,n-2)}+H_{R(m-2,n+2)})/3$$

In FIG. 7C, a vertical stripe zone is inferred, due to the known red hues, $H_{R(m-1,n)}$ and $H_{R(m+3,n)}$, having hues of approximately x. In one embodiment, the color interpolation algorithm 50 estimates the red hue, $H_{R(m,n)}$, for such a vertical zone using the following formula:

$$H_{R(m,n)}=(3*H_{R(m-1,n)}+H_{R(m+3,n)})/4$$

Note that more weight is given to the known red hue, $H_{R(m-1,n)}$, due to its proximity to the unknown red hue, $H_{R(m,n)}$.

In FIG. 7D, two of the known red hues, $H_{R(m-2,n-2)}$ and $H_{R(m+2,n+2)}$, have approximately the same value, x, and suggest that the unknown red hue, $H_{R(m,n)}$, may be in a diagonal arrangement. Accordingly, in one embodiment, the color interpolation algorithm 50 estimates the red hue, $H_{R(m,n)}$, for such a diagonal zone as follows:

$$H_{R(m,n)}=(H_{R(m-2,n-2)}+H_{R(m+2,n+2)})/2$$

Where, instead, known red hues, $H_{R(m+2,n-2)}$ and $H_{R(m-2,n+2)}$, have approximately the same value, y, the color interpolation algorithm 50 estimates the red hue, $H_{R(m,n)}$, using the following formula:

$$H_{R(m,n)}=(H_{R(m+2,n-2)}+H_{R(m-2,n+2)})/2$$

In FIG. 8A, the unknown red hue, $H_{R(m,n)}$, in the neighborhood 28 is moved downward one position (see FIG. 7A). In FIG. 8B, the unknown red hue occupies a smooth zone, as known red hues, $H_{R(m+1,n-2)}$, $H_{R(m+2,n)}$, and $H_{R(m+1,n+2)}$, have approximately the same value, x. Accordingly, the color interpolation algorithm 50 estimates the red hue, $H_{R(m,n)}$, by performing the following operation:

$$H_{R(m,n)}=(1/\sqrt{5}*H_{R(m+1,n-2)})+(\tfrac{1}{2}*H_{R(m+2,n)})+(1/\sqrt{5}*H_{R(m+1,n+2)})$$

In FIG. 8C, known red hues, $H_{R(m-2,n)}$ and $H_{R(m+2,n)}$, have approximately the same value, y, suggesting a vertical zone. In one embodiment, the color interpolation algorithm 50 derives the unknown red hue, $H_{R(m,n)}$, using the following formula:

$$H_{R(m,n)}=(H_{R(m-2,n)}+H_{R(m+2,n)})/2$$

The above operations used to derive red hues may likewise be performed on known blue hues to derive unknown blue hues. The color interpolation algorithm 50 thus performs pattern recognition of the known color hues in deriving unknown color hues.

Once all the red and blue hues are known, the red and blue values may be derived, using the formulas, $R=H_R+G$, and $B=H_B+G$, described above. Since the unknown green color values, G, have already been estimated, the color interpolation algorithm 50 has a complete representation of each of the red, blue, and green colors associated with each pixel 10 of the CFA 100.

Because the CFA 100 is designed to facilitate accurate color interpolation of the green values, a better estimation of hues is possible, in some embodiments. Because green is more prominently discerned by human eyes, the CFA 100 and color interpolation algorithm 50 may provide improved image quality.

In one embodiment, the color interpolation algorithm 50 is a software program that resides in a storage 52 of the imaging device 30 (see FIG. 1). Alternatively, a portion of the operations described herein may be performed using discrete logic circuitry. The storage 52 may include volatile storage, such as a random access memory, or non-volatile storage such as a read-only memory (ROM), a flash memory, or a hard disk drive.

Figure 9:
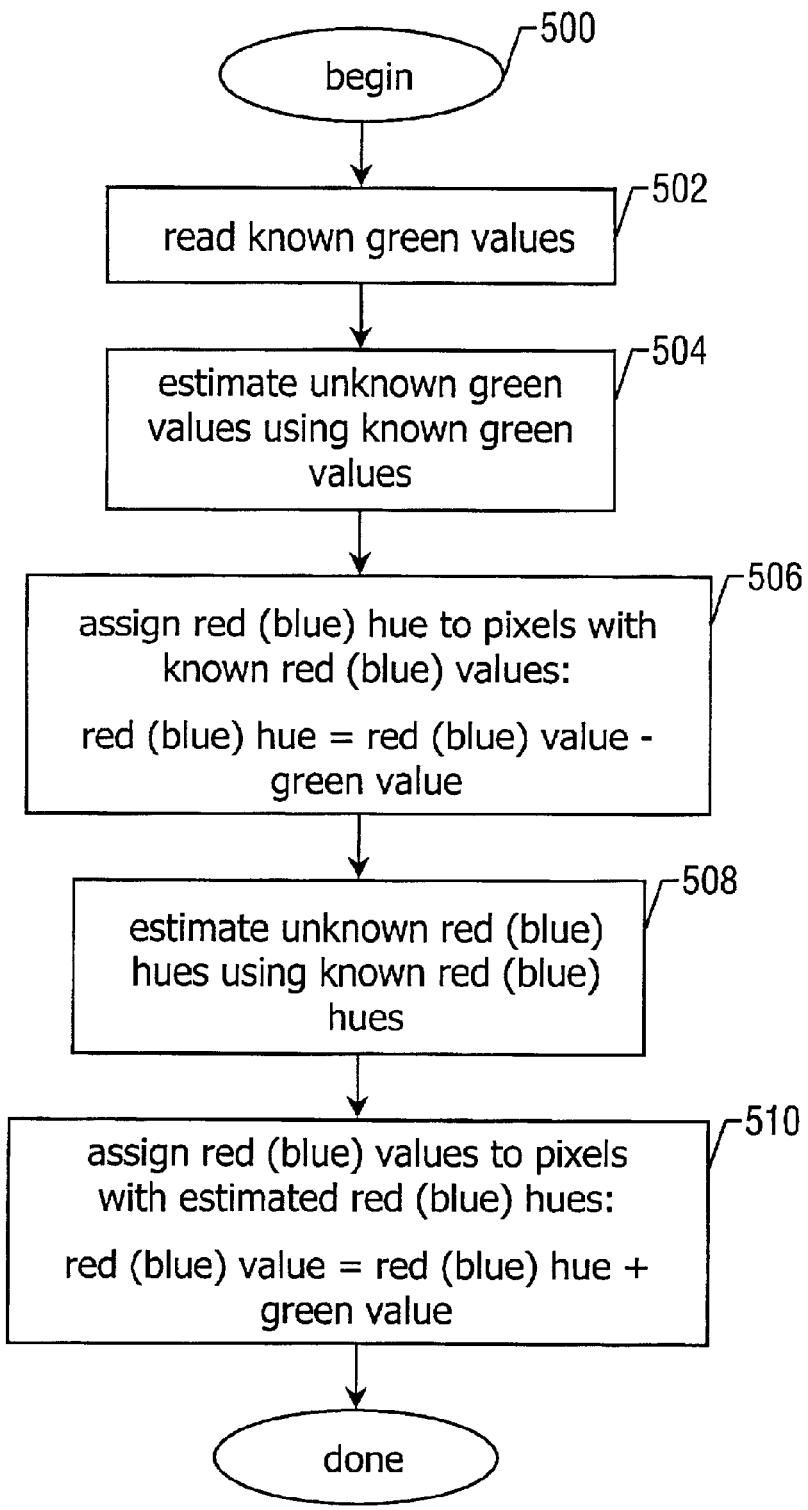
FIG. 9 is a flow diagram illustrating operation of the color interpolation algorithm according to one embodiment of the invention.

In FIG. 9, a flow diagram illustrates the operation of the color interpolation algorithm 50, according to one embodiment, and as described in detail above. Once an image is captured, the image data 12 may be stored. Typically, the image data 12 may be stored in a temporary frame buffer memory.

The color interpolation algorithm 50 is described where the CFA 100 utilizes the RGB color space. However, the algorithm 50 may readily be applied to the CFA 100 where the pixels 10 include other combinations of color filters, including but not limited to the cyan-magenta-yellow color space.

In one embodiment, the color interpolation algorithm 50 reads the known green intensity values, G (block 502). Recall that the green values, G, are produced by the pixels $10_g$ of the CFA 100 that have green filters. These known green values, G, are used to estimate the unknown green values, which correspond to the pixels $10_b$ and $10_r$ that have blue and red filters, respectively (block 504). This green estimation is performed as described in FIGS. 3A–3E, above.

Once green values are known for all the image data, in one embodiment, the color interpolation algorithm 50 assigns red (blue) hue to pixels with known red (blue) values (block 506), according to the formula shown. The color interpolation algorithm 50 performs subsequent estimation on hue values, not intensity values, according to one embodiment. As described in FIGS. 5A–5D, 6A–6C, 7A–7D, and 8A–8C, the unknown red (blue) hues corresponding to various pixel locations in the image data are interpolated from known red (blue) hues (block 508).

Once the red (blue) hues, $H_R$ ($H_B$), are known, the red (blue) values, R (B), may be derived, using the same hue formula, rearranged (block 510). The estimation of red hues may precede the estimation of blue hues, or vice-versa.

Once the estimation of red and blue hues is complete, the image may be reconstructed using the interpolated image data 80 produced by the color interpolation algorithm 50. By emphasizing the accurate estimation of the green color, the CFA 100 facilitates better performance of the color interpolation algorithm 50, in some embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining if a sub-block of image data comprising first color values, second color values, and third color values is an edge zone;
   estimating an interpolated first color value using first color values from four direct neighbors in the sub-block by averaging three of the four direct neighbors whose first color values are similar to produce an edge zone average, if the sub-block is an edge zone;
   multiplying the edge zone average by a value to produce a result; and
   averaging the result with the remaining direct neighbor to obtain the interpolated first color value.

2. The method of claim 1, further comprising:
   deriving a second color hue using the interpolated first color value and the second color value associated with the interpolated first color value; and
   estimating an interpolated second color hue using the second color hue.

3. The method of claim 2, further comprising:
   deriving a second color value from the interpolated second color hue.

4. The method of claim 1, further comprising:
   deriving a third color hue using the interpolated first color value and the third color value associated with the interpolated first color value;
   estimating an interpolated third color hue using the third color hue; and
   deriving a third color value from the interpolated third color hue.

5. The method of claim 1, further comprising determining the value based on a relationship of intensity between the first color values of the three direct neighbors and the remaining direct neighbor.

6. The method of claim 1, using the first color values from the four direct neighbors to estimate an interpolated first color value further comprising:
   if the sub-block is a smooth zone, averaging the first color values from the four direct neighbors to produce the interpolated first color value.

7. The method of claim 6, determining that the sub-block is a smooth zone further comprising:
   identifying the first color values for the four direct neighbors; and
   determining that the four first color values are substantially similar.

8. The method of claim 1, determining if the sub-block is an edge zone further comprising:
   identifying the first color values for the four direct neighbors; and
   determining that three of the four first color values are substantially similar.

9. A method comprising:
   determining if a sub-block of image data comprising first color values, second color values, and third color values is a stripe zone;
   estimating an interpolated first color value by averaging the first color values for a first direct neighbor and a second direct neighbor to produce a stripe zone average, where the first direct neighbor and the second direct neighbor form a stripe having substantially similar first color values, if the sub-block is a stripe zone;
   multiplying the stripe zone average by a value to produce a first partial result;
   producing a second partial result using a third direct neighbor and a fourth direct neighbor;
   combining the first partial result and the second partial result to obtain the interpolated first color value.

10. The method of claim 9, wherein combining the first partial result and the second partial result comprises:
    adding the first partial result and the second partial result together to produce a stripe zone result; and
    dividing the stripe zone result by four.

11. The method of claim 9, determining if the sub-block is a stripe zone further comprising:
    identifying the first color values for the four direct neighbors; and
    determining that a first pair of the first color values are substantially similar.

12. The method of claim 9, further comprising determining the value based on a relative strength of the stripe zone.

13. An article comprising a medium storing a software program that if executed enables a processor-based system to:
    determine if a sub-block of image data comprising first color values, second color values, and third color values is an edge zone;
    estimate an interpolated first color value using first color values from four direct neighbors in the sub-block by averaging three of the four direct neighbors whose first color values are similar to produce an edge zone average, if the sub-block is an edge zone;

multiply the edge zone average by a value to produce a result; and average the result with the remaining direct neighbor to obtain the interpolated first color value.

14. The article of claim 13, further storing a software program to enable a processor-based system to:

derive a second color hue using the interpolated first color value and the second color value associated with the interpolated first color value; and estimate an interpolated second color hue using the second color hue.

15. The article of claim 14, further storing a software program to enable a processor-based system to:

derive a second color value from the interpolated second color hue.

16. The article of claim 13, further storing a software program to enable a processor-based system to derive a third color hue using the interpolated first color value and the third color value associated with the interpolated first color value, estimate an interpolated third color hue using the third color hue, and derive a third color value from the interpolated third color hue.

17. The article of claim 13, further storing a software program to enable a processor-based system to determine the value based on a relationship of intensity between the first color values of the three direct neighbors and the remaining direct neighbor.

18. The article of claim 13, further storing a software program to enable a processor-based system to identify the first color values for the four direct neighbors, and determine that three of the four first color values are substantially similar.

* * * * *